Patented Apr. 9, 1946

2,398,003

UNITED STATES PATENT OFFICE 2,398,003

ACIDYL 4-THIOBIURETS AND PROCESS OF MAKING THEM

Arthur J. Hill, New Haven, and William M. Degnan, Southington, Conn., assignors to American Cyanamid Company, New York, N. Y., a corporation of Maine No Drawing. Original application May 28, 1941, Serial No. 395,624. Divided and this application June 7, 1943, Serial No. 489,958

8 Claims. (Cl. 260—552)

This invention relates to acidyl biurets which may be represented by the general formula: R—CO—B in which R represents either a dialkyl acetyl radical and B represents a biuret radical, the bond being to a terminal nitrogen.

The subject matter of the present application is a division of our copending application Serial No. 395,624, filed May 28, 1941, Patent No. 2,379,486, and relates more particularly to those compounds represented by the general formula R—CO—B in which B represents a 4-thio-biuret. Many compounds of this group possess unexpected hypnotic and sedative properties.

Acetyl biuret itself is a known compound, which can be prepared by direct acylation of biuret with the acid chloride. Benzoyl and phenacetyl biuret have been similarly prepared. However, this reaction can not be successfully carried out in the case of the thiobiurets. By making use of the novel procedure, the development of which is disclosed in our previously mentioned application, a new series of chemical compounds, the acidyl-4-thiobiurets, was prepared.

In general, the compounds of the present invention were prepared by reacting a suitable alkylacyl isocyanate with thiourea. The reaction products were purified by dissolution and reprecipitation to yield products having a sharp melting point. The acidyl-4-thiobiurets of the present invention, however, are not meant to be limited to any particular method of preparation.

The invention will be described in greater detail in conjunction with the following procedures which are meant to be illustrative only and not by way of limitation.

PREPARATION OF ALKYLACYL CHLORIDES

A number of substituted acetic acids were prepared according to the method of Levene and Cretcher (J. Biol. Chem. 35, 505 (1918). These were converted to the corresponding acid chlorides by allowing the acid to stand with 100% excess of thionyl chloride for about 12 hours. The resultant product was refluxed to complete the reaction and the acid chlorides so obtained were purified by distillation under vacuum through a packed column.

PREPARATION OF ALKYLACYL ISOCYANATES

The appropriate acid chloride was dissolved in five volumes of carefully dried diethyl ether and added slowly during stirring to a slight excess of freshly prepared silver cyanate suspended in dry ether. A round-bottomed flask, fitted with a sealed stirrer and a reflux condenser carrying a calcium chloride tube, was found to be convenient as a reaction vessel. In every case reaction commenced spontaneously and was completed by refluxing the reaction mixture gently for one to three hours. The suspension was then quickly filtered through a Büchner funnel to remove the silver chloride, and the ether was removed from the filtrate in the usual manner. The residue was then distilled under vacuum. Table 1 lists a number of representative acyl isocyanates prepared by the above process.

Table 1

| Acyl isocyanate | Boiling point, °C. |
|---|---|
| n-Butylethylacetyl | 78–85° at 20 mm. |
| s-Butylethylacetyl | 55–56° at 11 mm. |
| Isoamylethylacetyl | 100–105° at 30 mm. |
| Dibutylacetyl | 68–73° at 12 mm. |
| Phenylethylacetyl | 111–115° at 11 mm. |
| Allylethylacetyl | 83–85° at 34 mm. |
| Ethyldimethylacetyl | 65–70° at 10 mm. |

In the process described above for the preparation of the alkylacyl isocyanates, various other branched-chain alkylacetyl chlorides may be employed. The resultant isocyanate may then be converted to the corresponding 4-thio-biurets according to the procedure outlined below.

PREPARATION OF ALKYLACYL THIOBIURETS

The dialkylacetyl isocyanates react slowly or not at all with thiourea at the temperature of boiling ether, so reactions in this series were carried out in boiling benzene. Thiourea was suspended in dry benzene and exactly one equivalent of the isocyanate was added. The suspension was heated for about twelve hours, during which time the thiourea disappeared and a clear yellow solution with a characteristic unpleasant odor was formed. This was cooled in an icebath to precipitate a jelly-like material which was filtered off. Attempts to crystallize this crude product from water, alcohol, dilute alcohol, benzene, and dilute acetone failed, amorphous solids being obtained in each case. The acidyl thiobiurets were purified by dissolution in cold alcohol, followed by precipitation by the addition of an equal volume of cold water. Several repetitions of this operation gave products which melted sharply. The acyl thiobiurets were obtained as slightly yellow amorphous powders with marked pyroelectric properties.

Substitution of the suitable isocyanate in the above procedure yields the desired thiobiuret. Representative samples so prepared include the following:

Table 2

| Biuret | Melting point, °C. | Nitrogen | |
| --- | --- | --- | --- |
| | | Percent calcd. | Percent found |
| 1-diethylacetyl-4-thio | 132 | 19.20 | 19.35 |
| 1-isoamylethylacetyl-4-thio | 123 | 16.22 | 16.36 |
| 1-allylethylacetyl-4-thio | 123 | 18.34 | 18.40 |

We claim:

1. Acidyl thiobiurets capable of representation by the general formula

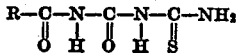

in which

represents a dialkyl acetyl radical.

2. Acidyl thiobiurets capable of representation by the general formula

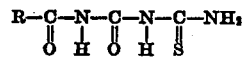

in which

represents a dialkyl acetyl, at least one of the alkyl substituents being unsaturated.

3. 1-diethylacetyl-4-thio-biuret.
4. 1-isoamylethylacetyl-4-thio-biuret.
5. 1-allylethylacetyl-4-thio-biuret.
6. A process of producing acidyl thiobiurets which comprises reacting a dialkylacetyl isocyanate with a thiourea.
7. A process of producing acidyl thiobiurets which comprises reacting the dialkyl acetyl halide with a silver cyanate to produce a dialkyl acetyl isocyanate and reacting said isocyanate with thiourea.
8. A process according to claim 7 in which the thiourea is suspended in dry benzene, one equivalent of the isocyanate is added thereto, and the mixture is heated until the thiourea disappears and a clear solution is formed, the solution is cooled to precipitate the product and the product is collected by filtration.

ARTHUR J. HILL.
WILLIAM M. DEGNAN.